United States Patent [19]

Smith, III

[11] Patent Number: 5,355,909

[45] Date of Patent: Oct. 18, 1994

[54] UNDERSEA HYDRAULIC COUPLING WITH METAL SEALS

[75] Inventor: Robert E. Smith, III, Missouri City, Tex.

[73] Assignee: National Coupling Company, Inc., Stafford, Tex.

[21] Appl. No.: 192,495

[22] Filed: Feb. 7, 1994

[51] Int. Cl.⁵ ............................................ F16L 37/28
[52] U.S. Cl. ........................ 137/614.04; 285/111,917
[58] Field of Search ................... 137/614.04, 614.03, 137/614.02, 614.05; 251/149.6, 149.8, 149.9; 277/236, 27, 102; 285/917, 111

[56] References Cited

U.S. PATENT DOCUMENTS

| 4,768,538 | 9/1988 | Mintz et al. | 137/614.04 X |
| 4,799,512 | 1/1989 | Sarson | 277/236 X |
| 4,832,080 | 5/1989 | Smith, III | 137/614.04 |
| 4,834,139 | 5/1989 | Fitzgibbons | 137/614.04 |
| 5,015,016 | 5/1991 | Smith, III | 137/614.04 X |
| 5,029,613 | 7/1991 | Smith, III | 137/614.04 |
| 5,099,882 | 3/1992 | Smith, III | 137/614.04 |
| 5,232,021 | 8/1993 | Smith | 137/614.04 |
| 5,277,225 | 1/1994 | Smith | 285/917 X |

Primary Examiner—Martin P. Schwadron
Assistant Examiner—Kevin L. Lee
Attorney, Agent, or Firm—Arnold, White & Durkee

[57] ABSTRACT

An undersea hydraulic coupling have a pair of hollow metal seals which are pressure energized to seal between the male and female members of the coupling. One of the hollow metal seals is configured to expand radially while the second hollow metal seal is compressible along the longitudinal axis of the coupling. These seals provide a fluid tight sealing arrangement upon pressurization of the coupling, without the need for external pre-load devices.

16 Claims, 2 Drawing Sheets

UNDERSEA HYDRAULIC COUPLING WITH METAL SEALS

BACKGROUND OF THE INVENTION

1. Field of the Invention

This invention relates, in general, to hydraulic couplings, and specifically to hydraulic couplings used in undersea drilling and production applications. More particularly, the invention involves an undersea hydraulic coupling having a pair of pressure energized metal seals for sealing between the male member and the female member of the coupling.

2. Description of the Related Art

Subsea hydraulic couplings are old in the art. The couplings generally consist of a male member and a female member with seals to seal the junction between the male and female members.

The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a cylindrical portion at one and to facilitate connection to hydraulic lines. When the cylindrical portion of the male member is inserted into the large bore of the female member, according to various embodiments of the device, the seals either abut the end, or face, of the male member or engage the male member about its circumference. The hydraulic fluid is then free to flow through the female and male portions of the coupling, and seals prevent that flow from escaping about the joints in the coupling.

A check valve may be installed in the female member and also in the male member. Each check valve is open when the coupling is made up; however, each check valve closes when the coupling is broken so as to prevent fluid from leaking out of the system of which the coupling is a part.

Soft seals used in undersea hydraulic couplings have numerous disadvantages, the principal ones being: 1) the inability of the seal to withstand the deteriorating effects of the subsea environment for extended periods of time; and 2) the inability of the soft seal to contain the higher pressures being imposed on hydraulic systems.

A metal seal is available which better withstands both deteriorating effects of the environment and higher pressures. That seal is a crush type seal which is positioned between the end of the male portion of the coupling and the internal end of the large bore in the female portion. When the male portion is inserted into the female, the metal seal is crushed between the two portions and the seal is effectuated between the two. In view of the crushing action, the seal can be used only once. If the coupling is separated for any reason, the once crushed seal can be replaced with a new seal. An example of this type of coupling and seal is shown in U.S. Pat. No. 3,918,485.

Another type of hydraulic coupler with a metal seal is disclosed in U.S. Pat. No. 4,637,470. As may be seen, this design uses a v-shaped metal seal. The metal v-shaped seal rests in the female member and is only effective when it is tightly compressed by pressure from the leading face of the male member. This means that substantial forces are needed to lock the coupling in the first place and to keep it locked under the necessary pressure. This design could leak even upon slight separation of the male and female coupling members, which is a problem because of the internal pressures when each hydraulic line is pressured up, as discussed above. The v-seal coupling requires a pre-load mechanism to prevent separation of the coupling members. Extremely close tolerances are required both for the couplings and manifold plates. In principal, the v-seal coupling was reusable and the coupling could be disengaged and reengaged more than once without replacing the seal. In practice, however, the v-seal would quite often flip out or flip sideways when the coupling was disconnected. If the coupling was reconnected without repositioning the v-seal, the coupler would be damaged beyond use.

In U.S. Pat. No. 4,694,859 to Robert E. Smith III, an undersea hydraulic coupling with a radial metal seal is disclosed. This coupling provides a reusable radial metal seal which engages the circumference of the probe when it is positioned within the female member body. The metal seal is held in place by a cylindrical body or retainer. The retainer prevents escape of the metal seal from the female member body. When the male and female portions of the coupling are parted under pressure, the retainer prevents the metal seal from blowing out through the bore of the female member. This coupling uses a pressure actuated metal c-ring seal. Among the advantages of this design are that it requires no pre-load mechanism, is tolerant to movement of the two halves of the coupling relative to one another, and allows greater tolerances between the couplings and the manifold plates. The retainer also may be used to pre-load the metal c-ring seal by urging it radially inwardly to engage the circumference of the male member. This is accomplished by positioning the seal on a shoulder within the female member bore, then locking the retainer against the seal.

In U.S. Pat. Nos. 4,832,080, 5,099,882 and 5,277,225 to Robert E. Smith III, undersea hydraulic couplings are shown having at least two radial metal seals for sealing between the male member and the female member receiving chamber. Pressure energized seals are shown which are configured to seal radially between the male and female members, and the couplings are pressure balanced for fluid communication through mating radial passages and the annular space between the members.

In U.S. Pat. No. 5,015,016 to Robert E. Smith III, an undersea hydraulic coupling is shown having a ring-shaped metal seal with a v-shaped cross section. A cylindrical sleeve retains the seal in place. Upon insertion of the male member into the coupling, the end face of the male member contacts the lip of the v-seal, which compresses the v-seal slightly to pre-load the seal before pressurization of the coupling. When the system is pressure energized, the sleeve is urged toward the male member to keep the v-seal against the male member. The pressurization urges the v-seal to expand longitudinally against the leading face of the male member and the internal shoulder of the sleeve member.

SUMMARY OF THE INVENTION

The present invention resides in a hydraulic coupling of the foregoing type including male and female members for fluid communication therebetween and valves for controlling fluid flow in each of the members. The present invention includes a pair of hollow metal seals which are pressure energized to seal between the male and female members. One of the pressure energized metal seals expands radially to engage the cylindrical outer surface of the male member and the bore of the female member, and the second pressure energized metal seal is adapted to expand longitudinally to engage the outer shoulder surface on the male member and the inner shoulder surface in the female member bore. Each of the seals is retained upon separation of the members.

The present invention provides the advantages of both a radial metal seal and a face-type seal between the coupling members, and can be repeatedly used without replacing the seals. Additionally, this coupling provides a reduced number of separate components that must be separately machined, as the seals are positionable between separate shoulder surfaces on the male and female members.

DETAIL DESCRIPTION OF A PREFERRED EMBODIMENT

Figure 1:
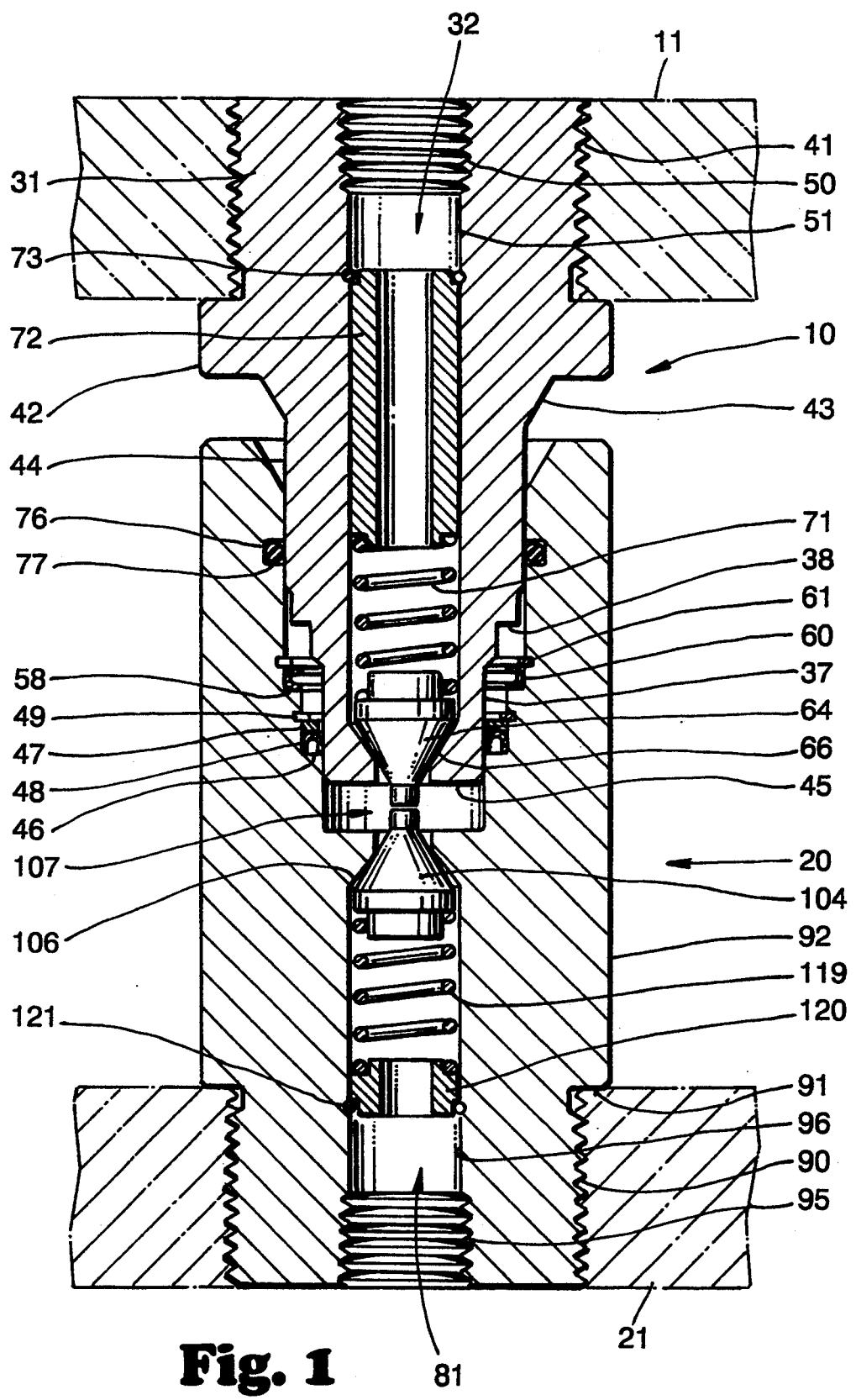
FIG. 1 is a section view of the male and female members of the coupling, with the male member partially inserted into the female member bore.

FIG. 1 is a section view of the male member 10 and the female member 20 as the male member is partially inserted into the female member bore. The male member 10 is attached to manifold plate 11 by threads 41 or other means, such as set screws. The female member 20 is attached to a second manifold plate 21 by threads 90 or other means. Techniques for attaching the members to such plates are well known to those skilled in the art.

The male member 10, as shown in FIG. 1, comprises a probe handle 31, which is threaded to manifold plate 11, as explained above. Adjacent the probe handle is flange 42 and tapered shoulder 43. The shoulder 43 is tapered down to the first end 44 of the cylindrical probe wall, outer shoulder 38 which provides a stepped reduction in the outer diameter, and second end 37 of the probe wall which terminates at probe face 45. The cylindrical probe wall is adapted for sliding engagement with the female member, as will be discussed below. In a preferred embodiment, the probe wall has variations in its outside diameter.

The body of the male member also is provided with a central bore 32. The bore 32 may have several variations in its diameter as it extends through the body of the male member 10. In a preferred embodiment, the first end of the central bore comprises an internally threaded section 50 for connection to a hydraulic line. Adjacent and inboard of the threaded section is a cylindrical passageway 51 extending longitudinally within the male member body and terminating at valve seat 66 which is an inclined shoulder.

As shown in FIG. 1, the poppet valve assembly of the male member is slidably received within the central bore 32. The various parts of the poppet valve assembly are cylindrical hollow valve head 64 which has an outer diameter dimensioned to slide within the cylindrical bore 32. The valve head is conical in shape and dimensioned to seat on the valve seat 66 at the end of the male member bore. Helical valve spring 71 is used to urge the valve 64 into a closed position against the valve seat 66. The helical valve spring 71 is located within the cylindrical bore 32 and anchored with spring collar 72 which is held in place by collar clip 73.

The female member 20 comprises a handle 90 which is optionally threaded to manifold plate 21. Female member 20 also includes a shoulder 91 which is adjacent the handle 90 and the main cylindrical body 92. The central bore 81 has several variations in its diameter, as it extends longitudinally or axially through the body of the female member 20. At a first or outer end of the central bore 81 is a threaded internal passageway 95 for connection to a threaded hydraulic line. The threaded portion 95 of the central bore 81 terminates at cylindrical passageway 96 which slidably receives a poppet valve assembly. Cylindrical passageway 96 terminates at valve seat 106 for seating poppet valve 104. Inboard of the valve seat is a cylindrical receiving chamber 107. The receiving chamber slidably receives the probe of the male member 10. As shown in FIG. 1, when the poppet valves are in contact with another, the valves are forced into open positions for fluid flow between the male and female members.

The valve assembly of the female member 20 comprises a poppet valve 104 which is slidably received within the cylindrical passageway 96 of the female member 20. The poppet valve 104 has a generally conical shape for seating at valve seat 106. To urge the valve into the closed position, helical valve spring 119 is mounted between the shoulder of the valve and spring collar 120 having collar clip 121 in the female member bore. The valves of the female member and of the male member are preferably identical in components and function.

Figure 2:
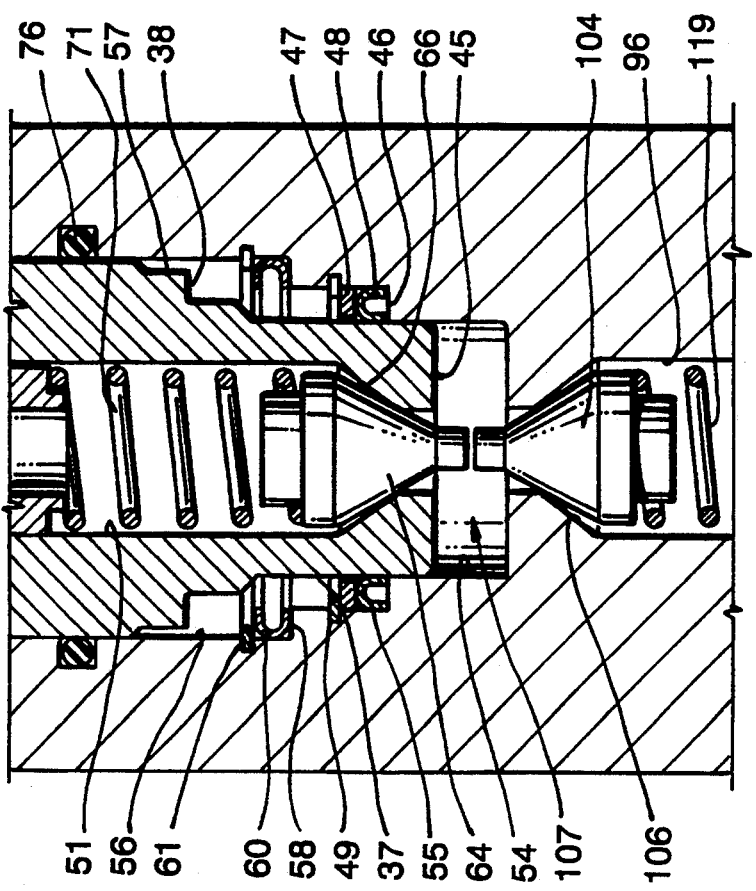
FIG. 2 is a section view of the seals used in the coupling, before the male member is fully inserted into the female member bore.

Now referring to FIG. 2, the seals in a preferred embodiment of the present invention are shown in detail. In the receiving chamber 107 of the female member, there are variations in the internal diameter for positioning a pair of hollow pressure-energized metal seals. At the innermost end of the receiving chamber is cylindrical section 54 dimensioned to slidably receive the second end 37 of the probe wall. At the outermost end of the receiving chamber is cylindrical section 56 dimensioned to slidably receive the first end 44 of the probe wall. Cylindrical section 54 terminates at internal shoulder 46 which provides a surface for positioning of hollow metal seal 48. Hollow metal seal 48 is preferably a c-shaped metal seal which is pressure energized to expand both radially inwardly against the male member probe wall and radially outwardly against the receiving chamber at cylindrical section 55. If desired, the metal seal 48 may be dimensioned to have a slight radial interference with either the receiving chamber at section 55, or with the second section 37 of the probe wall. It is intended that the metal seal 48 achieve a fluid tight seal due to hydraulic fluid pressure within the coupling itself. The metal seal is preferably made of a thin metal that is sufficiently flexible to withstand repeated uses without fatigue. The seal may be readily obtained from metal seal manufacturers.

To hold the metal seal 48 in place upon separation of the male and female members, washer 47 is positioned over the seal. Washer 47 is held in place with retainer clip 49. Preferably, the retainer clip 49 is configured to engage a slot in the receiving chamber wall, although other methods, such as threading, may be used to anchor the retainer or other means to hold the metal seal 48 and/or washer 47 in place. Alternatively, washer 47 may be omitted and a retainer or other means used as the only mechanism for holding metal seal 48 in place.

Moving further out of the receiving chamber 107, shoulder 58 is an internal shoulder which provides a location for positioning second hollow metal seal 60. The second hollow metal seal 60 is similar to first hollow metal seal 48. However, metal seal 60 is positioned so that it may be compressed in a longitudinal or axial direction. As shown in a preferred embodiment, metal seal 60 also is flexible to seal longitudinally or axially in response to fluid pressure, which urges the seal to expand against inner shoulder 58 in the receiving chamber and outer shoulder 38 of the male member. Metal seal 60 is retained by retainer clip 61 which is configured to fit in a groove in the receiving chamber. However, other retaining means such as a threaded retainer may be used to retain the metal seal so that it can be repeatedly be used.

Hollow metal seal 60 may be a c-shaped seal, a u-shaped seal, or a v-shaped seal which provides a face-to-face seal between outer shoulder 38 of the male member and internal shoulder 58 of the female member. Such seals are commercially available from several metal seal manufacturers.

Figure 3:
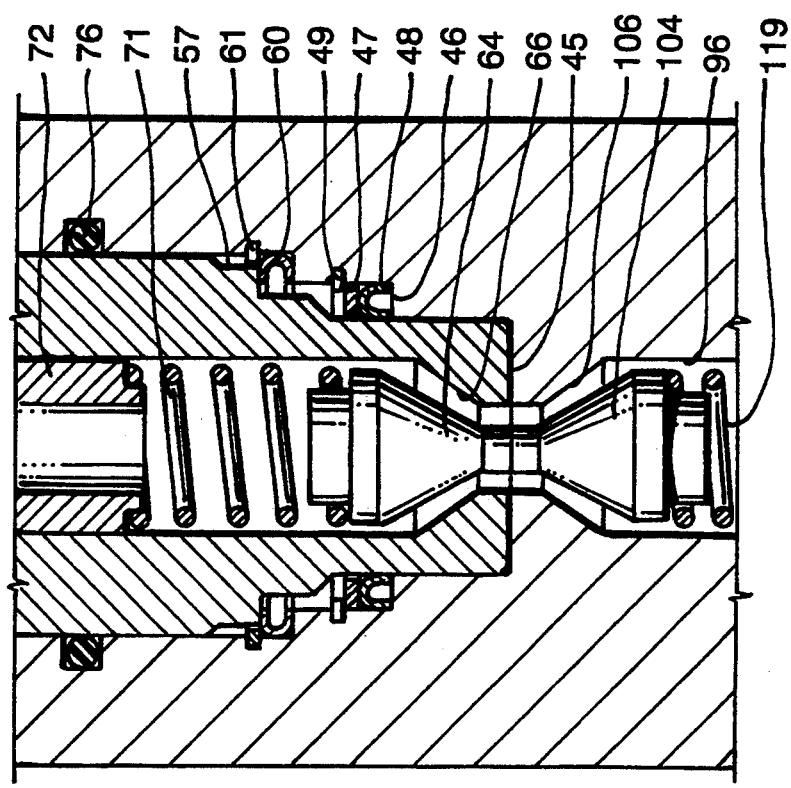
FIG. 3 is a section view of the seals used in the coupling, with the male member fully inserted into the female member bore.

The receiving chamber 107 of the female member also has a groove 77 for back-up elastomeric seal 76 as Shown in FIGS. 2 and 3. The back-up elastomeric seal may be a dovetail seal as shown in U.S. Pat. Nos. 4,900,071 and 5,052,439 issued to Robert E. Smith III, to help prevent implosion of the seal into the receiving chamber when the male member is withdrawn. However, in a preferred embodiment of the present invention, the male member probe wall has a small step 57 in its outer diameter to help prevent implosion by balancing elastomeric seal 76 with sea pressure as the male member is removed from the receiving chamber.

As shown, the present invention eliminate s the need for any external pre-load devices, or spring washers, for pre-loading either of the metal seals. Instead, hollow metal seal 60 is slightly compressed before pressurizing, then line pressure is used to urge metal seal 60 to form a face seal between outer shoulder surface 38 of the male member and inner shoulder surface 58 in the cylindrical bore of the female member. At the same time, metal seal 48 is pressure energized to expand radially to engage the cylindrical outer surface of the male member body and the cylindrical bore of the female member. Both seals are reusable because they are retained in place upon separation of the male and female members of the coupling.

It will now be understood by those of skill in the art that an improved undersea hydraulic coupling may be made utilizing the present invention. Although variations in the embodiment of the present invention may not each realize all of the advantages of the invention, certain features may become more important than others in various applications of the device. The invention, accordingly, should be understood to be limited only by the scope of the appended claims.

I claim:

1. An undersea hydraulic coupling comprising:
   (a) a female member having an internal bore extending therethrough, a valve slidable in the female member bore for controlling fluid flow through the female member bore, the bore having first and second sections with at least one inner shoulder surface between the first and second sections of the female member bore, the second section having a greater diameter than the first section;
   (b) a male member having an internal bore extending therethrough, a valve slidable in the male member bore for controlling fluid flow through the male member bore, an outer body having first and second sections, the first section of the outer body dimensioned to slide within the first section of the female member bore and the second section of the outer body dimensioned to slide within the second section of the female member bore, and at least one outer shoulder surface between the first and second sections of the male member outer body; and
   (c) first and second hollow metal seals positionable between the first and second sections of the female member bore; the first seal being positionable on the inner shoulder surface of the female member bore and being axially compressible between the inner shoulder surface and the outer shoulder surface of the male member upon insertion of the male member into the female member bore, the hollow metal seals being pressure-energizable to seal between the male member outer body, and female member bore upon fluid pressurization of the coupling.

2. The undersea hydraulic coupling of claim 1 wherein the female member bore comprises two inner shoulder surfaces, each of the hollow metal seals seated on a separate shoulder surface.

3. The undersea hydraulic coupling of claim 1 wherein the first hollow metal seal is flexible in response to fluid pressure in the coupling to be urged axially against the outer shoulder surface of the male member and the inner shoulder surface of the female member.

4. The undersea hydraulic coupling of claim 1 wherein the second hollow metal seal is flexible in response to fluid pressure in the coupling to be urged radially against the female member bore and against the male member outer body.

5. The undersea hydraulic coupling of claim 1 further comprising first and second seal retainers engageable with the female member to hold the first and second seals in place upon separation of the male and female members.

6. The undersea hydraulic coupling of claim 1 further comprising an elastomeric seal in the female member bore, and wherein the outer body of the male member comprises a reduced diameter section to balance fluid pressure around the elastomeric seal as the male member is removed from the female member bore.

7. An undersea hydraulic coupling comprising:
   (a) a female member having a body with a cylindrical bore extending longitudinally from a first end to a second end of the body, first and second separate internal shoulder surfaces in the female member bore, and a normally closed valve in the female member bore for control of fluid flow between the first end and second end;
   (b) a male member insertable into the female member bore and having a body with a bore extending longitudinally from a first end to a second end of the body, a normally closed valve in the male member bore for control of fluid flow between the first end and second end, the body having a cylindrical outer surface with at least one outer shoulder surface;
   (c) a first hollow metal seal positionable adjacent the first internal shoulder surface in the female member bore, the first seal being pressure-energizable to expand radially to engage the cylindrical outer surface of the male member body and the bore of the female member; and (d) a second hollow metal seal positionable adjacent the second internal shoulder surface in the cylindrical bore of the female member, the second seal being pressure-energizable to expand longitudinally to engage the outer shoulder surface of the male member body and the second inner shoulder surface in the cylindrical bore of the female member.

8. The undersea hydraulic coupling of claim 7 wherein the first hollow metal seal has a C-shaped cross-section.

9. The undersea hydraulic coupling of claim 7 further comprising seal retaining means engageable with the female member body and wherein the first seal is positionable between the first inner shoulder surface and the seal retaining means.

10. The undersea hydraulic coupling of claim 7 wherein the second hollow metal seal has a C-shaped cross-section.

11. The undersea hydraulic coupling of claim 7 further comprising seal retaining means engageable with the female member body and wherein the second seal is positionable between the second inner shoulder surface and the seal retaining means.

12. An undersea hydraulic coupling comprising:
(a) a male member having a first end, a second end, a longitudinal bore extending therethrough, and a probe wall with a stepped outer diameter, the steps defining a reduced diameter toward the second end of the male member;
(b) a female member having a first end, a second end, and a longitudinal bore extending therethrough, the male member being insertable into the longitudinal bore of the female member, the longitudinal bore of the female member having a stepped inner diameter, the steps defining a reduced diameter toward the second end of the female member;
(c) a first hollow metal seal positionable between one of the steps on the outer diameter of the probe wall of the male member and one of the steps on the inner diameter of the longitudinal bore of the female member, the first seal being expansible radially inwardly against the probe wall and radially outwardly against the female member bore; and
(d) a second hollow metal seal positionable between one of the steps on the outer diameter of the probe wall of the male member and one of the steps on the inner diameter of the longitudinal bore of the female member, the second seal being compressible axially between one of the steps on the outer diameter of the probe wall and one of the steps on the inner diameter of the female member bore.

13. The undersea hydraulic coupling of claim 12 further comprising retaining means for retaining each of the seals upon separation of the male and female members.

14. The undersea hydraulic coupling of claim 12 further comprising normally closed valve means in each of the male and female members, the valve means openable upon insertion of the male member into the female member bore.

15. The undersea hydraulic coupling of claim 12 further comprising an elastomeric back up seal positionable between the probe wall of the male member and the longitudinal bore of the female member.

16. The undersea hydraulic coupling of claim 12 wherein the second seal is pressure-energized to expand axially against one of the steps in the probe wall and one of the steps in the female member bore.

* * * * *